US012586890B2

(12) United States Patent
Lee et al.

(10) Patent No.: US 12,586,890 B2
(45) Date of Patent: Mar. 24, 2026

(54) ANTENNA DEVICE AND VEHICLE INCLUDING THE SAME

(71) Applicants: Hyundai Motor Company, Seoul (KR); Kia Corporation, Seoul (KR); WINNERCOM CO., LTD., Gimhae-si (KR)

(72) Inventors: Byoung Hyun Lee, Yongin-Si (KR); Yoon Soo Kim, Seoul (KR); Ha Yoon Chong, Yongin-Si (KR); Jae Hoon Jung, Suwon-Si (KR); Keun Ho Back, Hanam-Si (KR)

(73) Assignees: Hyundai Motor Company;, Seoul (KR); Kia Corporation, Seoul (KR); Winnercom Co., Ltd., Gimhae-si (KR)

( * ) Notice: Subject to any disclaimer, the term of this patent is extended or adjusted under 35 U.S.C. 154(b) by 222 days.

(21) Appl. No.: 18/388,034

(22) Filed: Nov. 8, 2023

(65) Prior Publication Data

US 2025/0015486 A1 Jan. 9, 2025

(30) Foreign Application Priority Data

Jul. 7, 2023 (KR) ........................ 10-2023-0088442

(51) Int. Cl.
*H01Q 1/12* (2006.01)
*H01Q 9/04* (2006.01)

(52) U.S. Cl.
CPC ......... *H01Q 1/1271* (2013.01); *H01Q 9/0407* (2013.01)

(58) Field of Classification Search
CPC ........................... H01Q 1/1271; H01Q 9/0407
See application file for complete search history.

(56) References Cited

U.S. PATENT DOCUMENTS

2019/0280365 A1* 9/2019 Song .................... H01Q 1/1271
2023/0291107 A1* 9/2023 Hara .................... H01Q 9/0407
2024/0405436 A1* 12/2024 Kwon .................... H01Q 5/335

FOREIGN PATENT DOCUMENTS

KR 20130048893 A * 5/2013 ........... H01Q 9/0428

* cited by examiner

*Primary Examiner* — Daniel Munoz
(74) *Attorney, Agent, or Firm* — MORGAN, LEWIS & BOCKIUS LLP

(57) ABSTRACT

An antenna device and a vehicle including the same, includes at least one antenna disposed on a transparent inclined surface in an interior of a vehicle, and including a radiation patch facing a first radiation direction being perpendicular to the inclined surface, and a partition wall surrounding at a portion of the at least one antenna. The partition wall is configured so that a beam radiated from the radiation patch in the first radiation direction is inclined from the first radiation direction toward a second radiation direction.

16 Claims, 12 Drawing Sheets

ANTENNA DEVICE AND VEHICLE INCLUDING THE SAME

CROSS-REFERENCE TO RELATED APPLICATION

The present application claims priority to Korean Patent Application No. 10-2023-0088442, filed on Jul. 7, 2023, the entire contents of which is incorporated herein for all purposes by this reference.

BACKGROUND OF THE PRESENT DISCLOSURE

Field of the Present Disclosure

The present disclosure relates to an antenna device and a vehicle including the same, and more particularly, to an antenna device which may enhance performance, and a vehicle including the same.

DESCRIPTION OF RELATED ART

Demands for provision of various communication services and multimedia services for vehicles have been increased. With development of autonomous driving vehicles, demands for communication technologies for consistent communication with infrastructures around roads and vehicles and for exchanging or sharing information on traffic situations also have become gradually higher.

In recent years, to secure excellent designs of vehicles, antenna devices which may be mounted in interiors of vehicles may been developed. A signal reception rate of an antenna device mounted in an interior of a vehicle becomes lower due to interferences of a vehicle body than when it is mounted on an outside of the vehicle, and thus performance may be degraded.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an antenna device which may enhance performance, and a vehicle including the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an antenna device includes at least one antenna disposed on a transparent inclined surface in an interior of a vehicle, and including a radiation patch facing a first radiation direction being perpendicular to the first inclined surface, and a partition wall surrounding at a portion of the at least one antenna, and the partition wall is configured so that a beam radiated from the radiation patch in the first radiation direction is inclined from the first radiation direction toward a second radiation direction.

In an exemplary embodiment of the present disclosure, the partition wall may be formed to surround at least a portion of two side surfaces defining any one of side edge portions of the at least one antenna.

In an exemplary embodiment of the present disclosure, the partition wall may be formed to surround at least a portion of the two side surfaces defining the side edge portion facing an opposite direction to the second radiation direction.

In an exemplary embodiment of the present disclosure, the partition wall may be formed to be higher than a height of the at least one antenna.

In an exemplary embodiment of the present disclosure, the partition wall may include a first partition wall area facing one side surface of side surfaces of the at least one antenna, and a second partition wall area facing, among the side surfaces, a side surface being different from the one side surface which the first partition wall faces.

In an exemplary embodiment of the present disclosure, the partition wall may be disposed so that the first partition wall area and the second partition wall area are perpendicular to the radiation patch.

In an exemplary embodiment of the present disclosure, a height of at least one of the first partition wall area or the second partition wall area may be greater than a height of the at least one antenna.

In an exemplary embodiment of the present disclosure, the partition wall may further include a protruding area bent from at least one of the first partition wall area or the second partition wall area and protruding toward the at least one antenna.

In an exemplary embodiment of the present disclosure, the protruding area may be disposed to be parallel to the radiation patch.

In an exemplary embodiment of the present disclosure, the antenna device may further include a circuit board, in which the at least one antenna and the partition wall are disposed, and the protruding area may be exposed between the at least one antenna and the partition wall.

In an exemplary embodiment of the present disclosure, the protruding area may overlap a portion of the radiation patch while being spaced from the radiation patch.

In an exemplary embodiment of the present disclosure, the partition wall may be formed to face a chamfer formed in the radiation patch.

In an exemplary embodiment of the present disclosure, the at least one antenna may receive a signal of a satellite frequency band.

In an exemplary embodiment of the present disclosure, the antenna device may further include a case defining an accommodation space, in which the at least one antenna and the partition wall are accommodated, and the case may include a first cover, and a second cover facing the first cover, and on which a circuit board, on which the at least one antenna and the partition wall are disposed, is accommodated.

In an exemplary embodiment of the present disclosure, the first cover may be attached to the transparent inclined surface of the vehicle.

According to another aspect of the present disclosure, a vehicle that fluidically-communicates with an external device includes the antenna device.

In an exemplary embodiment of the present disclosure, the transparent inclined surface may be a front glass of the vehicle, and the partition wall may tilt a beam radiated from the at least one antenna in the first radiation direction being perpendicular to the front glass, in a second direction being perpendicular to a ground surface and facing an opposite direction to the ground surface.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1A:
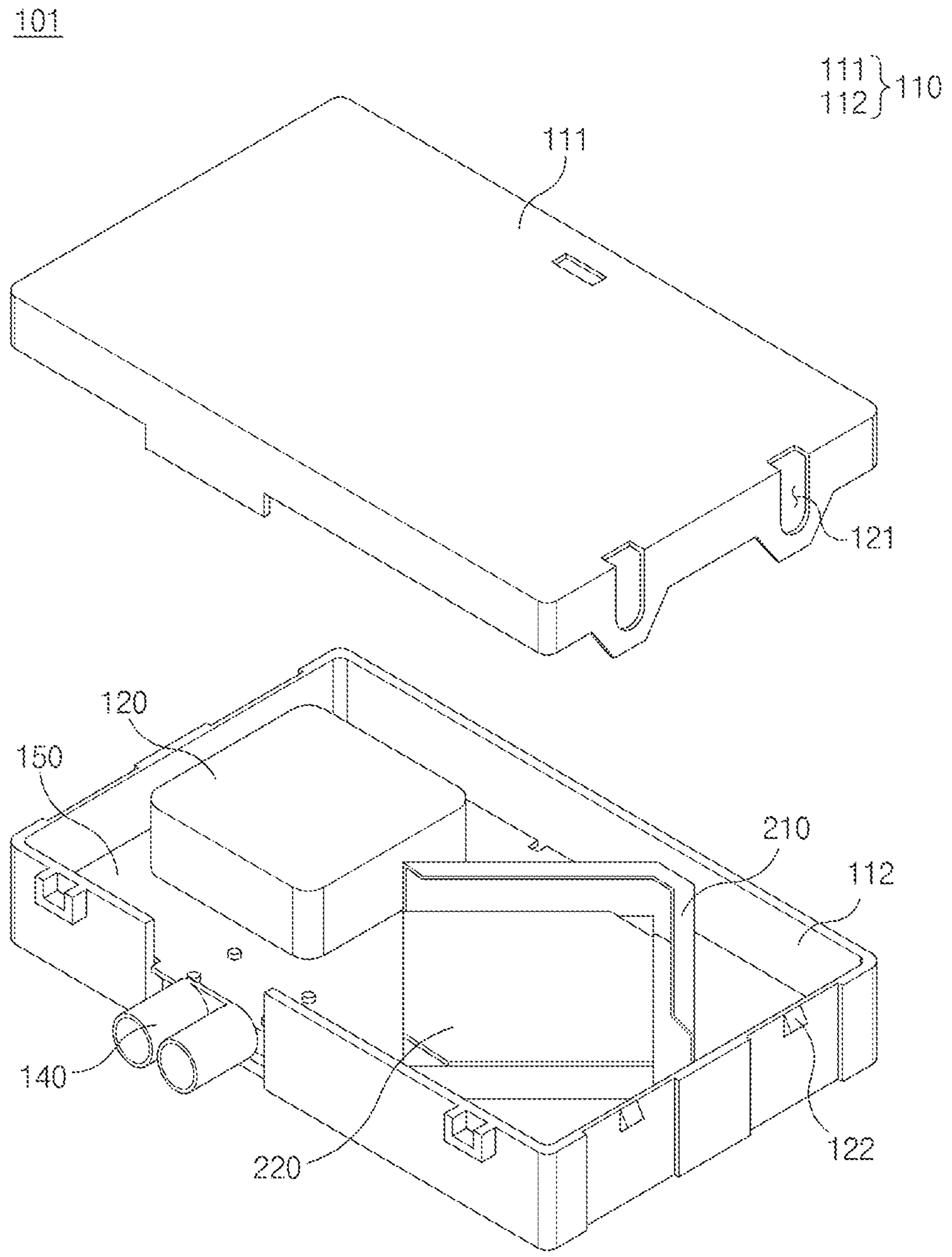
FIG. 1A and FIG. 1B are exploded perspective views exemplarily illustrating an antenna device for a vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding reference numerals to the components of the drawings, it is noted that the same components are denoted by the same reference numerals even when they are drawn in different drawings. Furthermore, in describing the exemplary embodiments of the present disclosure, when it is determined that a detailed description of related known configurations and functions may hinder understanding of the exemplary embodiments of the present disclosure, a detailed description thereof will be omitted.

Furthermore, in describing the components of the exemplary embodiments of the present disclosure. terms, such as first, second, "A", "B", (a), and (b) may be used. The terms are simply for distinguishing the components, and the essence, the sequence, and the order of the corresponding components are not limited by the terms. Unless defined differently, all the terms including technical or scientific terms include the same meanings as those generally understood by an ordinary person in the art, to which the present disclosure pertains. The terms, such as the terms defined in dictionaries, which are generally used, should be construed to coincide with the context meanings of the related technologies, and are not construed as ideal or excessively formal meanings unless explicitly defined in an exemplary embodiment of the present disclosure.

Hereinafter, referring to FIGS. 1A to 7, various exemplary embodiments of the present disclosure will be described in detail.

Figure 1B:
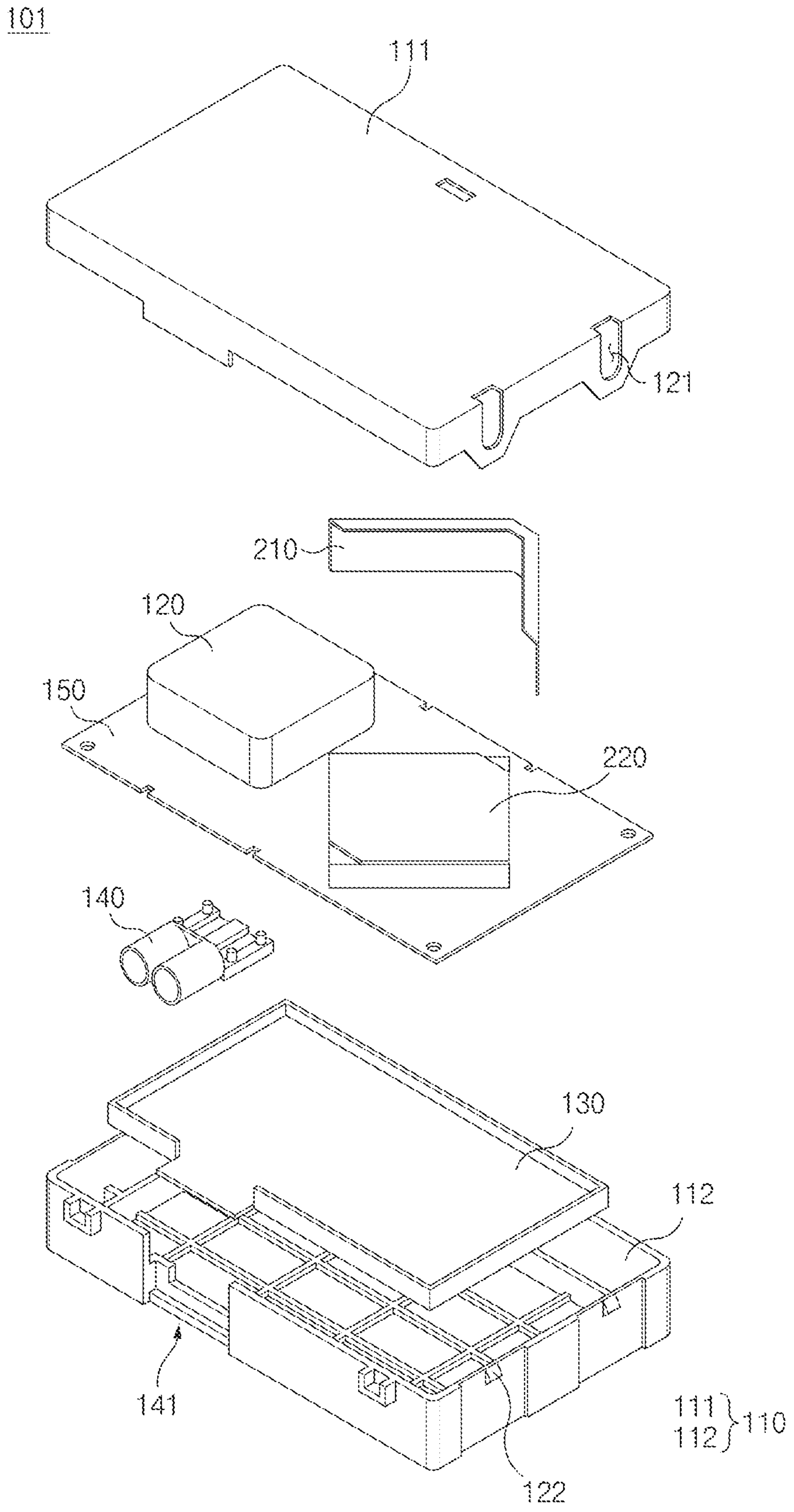

FIG. 1A and FIG. 1B are perspective views exemplarily illustrating an antenna device for a vehicle according to an exemplary embodiment of the present disclosure.

Referring to FIG. 1A and FIG. 1B, an antenna device 101 for a vehicle may be disposed in an interior of a vehicle. The antenna device 101 may include a case 110, a circuit board 150, at least one antenna 120 and 220, and a partition wall 210.

The case 110 may embed various parts that are necessary for an operation of the antenna device 101, and may safely protect the embedded parts from an external impact while stably fixing the embedded parts. The case 110 may have various shapes according to an installation location of the antenna device 101 or shapes of the embedded parts. As an exemplary embodiment of the present disclosure, the case 110 may include a polyhedral, cylindrical, or spherical shape, or at least one surface thereof may be streamlined.

The case 110 may include a first cover 111 and a second cover 112. The first cover 111 may be disposed to face an outside of the vehicle. The second cover 112 may be disposed to face the first cover 111. The second cover 112 may be disposed to face an interior of the vehicle. The second cover 112 may be coupled to the first cover 111. Any one of a coupling boss 122 or a coupling hole 121 that protrudes to an outside of the second cover 112 may be included on at least one side surface of the second cover 112, and the remaining one of the coupling boss 122 and the coupling hole 121 may be included on at least one side surface of the first cover 111. As an exemplary embodiment of the present disclosure, the coupling boss 122 formed in the second cover 112 may be fastened to the coupling hole 121 formed in the first cover 111.

As the second cover 112 and the first cover 111 are coupled to each other, an internal space may be provided between the first cover 111 and the second cover 112. The circuit board 150, the at least one antenna 120 and 220, and the partition wall 210 may be accommodated in an interior of the case 110.

The circuit board 150 is disposed on the second cover 112, and processes a signal received through the at least one antenna 120 and 220. For example, the circuit board 150 may remove noise and the like by filtering a signal of a desired frequency band, and may amplify the signal to a necessary level.

The at least one antenna 120 and 220 may transmit and receive various signals. The at least one antenna 120 and 220 may include a Global Navigation Satellite System (GNSS) antenna, an SXM antenna, and a communication antenna. The GNSS antenna and the SXM antenna are patch antennae, and the communication antenna may be a monopole antenna of a coil form that receives a communication signal, such as an FM/AM signal or an Long-Term Evolution (LTE).

The at least one antenna 120 and 220 may include the first antenna 220 and the second antenna 120. The first antenna 220 and the second antenna 120 may be operated at the same or different frequency bands. As an exemplary embodiment of the present disclosure, any one of the first antenna 220 and the second antenna 120 may be a GNSS antenna, and the remaining one of the first antenna 220 and the second antenna 120 may be an SXM antenna. Hereinafter, a case, in which the first antenna 220 is an SXM antenna and the second antenna 120 is a GNSS antenna will be referred to as an example.

Upper surfaces of the first antenna 220 and the second antenna 120, which are radiation patches, may be formed to face the first cover 111, and may have various shapes, such as a polygonal shape, a circular shape, or an elliptical shape. When the first antenna 220 is viewed from the first cover 111, at least one side of the upper surface of the first antenna 220 may face at least two sides of the circuit board 150. At least one apex of the upper surface of the first antenna 220 may face one side of the circuit board 150. When the second antenna 120 is viewed from the first cover 111, at least one side of the upper surface of the second antenna 120 may correspond to at least one of the circuit board 150 in a one-to-one relationship. The at least one side of the upper surface of the second antenna 120 may be formed in parallel to the at least one side of the circuit board 150.

The partition wall 210 may be formed to surround at least a portion of the first antenna 220, and may be formed to be higher than the first antenna 220. The partition wall 210 may be spaced from the first antenna 220 and the second antenna 120.

According to an exemplary embodiment of the present disclosure, the antenna device 101 may include a cable 140 that transmits and receives an antenna signal, a shield can 130, and a plurality of sensors. The shield can 130 may shield electromagnetic waves that are radiated to an outside thereof. The shield can 130 may be disposed between the second cover 112 and the circuit board 150. The shield can 130 may surface-contact with the circuit board 150.

The antenna device 101 may be disposed in an interior of the vehicle. For example, the antenna device 101 may be provided in at least one of a ground surface (or a road), or a front glass, a rear glass, and a side glass of the vehicle, which are inclined on a roof of the vehicle.

The antenna device 101 may receive or transmit information, such as road traffic information, radio broadcast, or vehicle location information, which are necessary for the user who utilizes the vehicle, or road traffic information which is necessary for autonomous driving of the vehicle, from or to an external device.

Figure 2A:
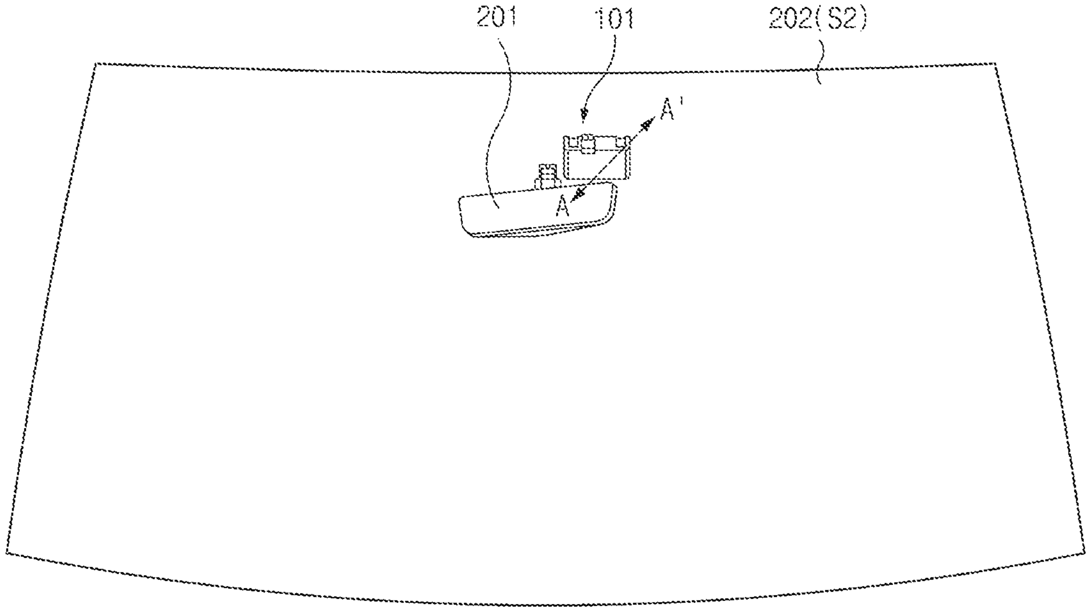
FIG. 2A is a view exemplarily illustrating an antenna device according to an exemplary embodiment of the present disclosure, which is mounted on a vehicle.
Figure 2B:
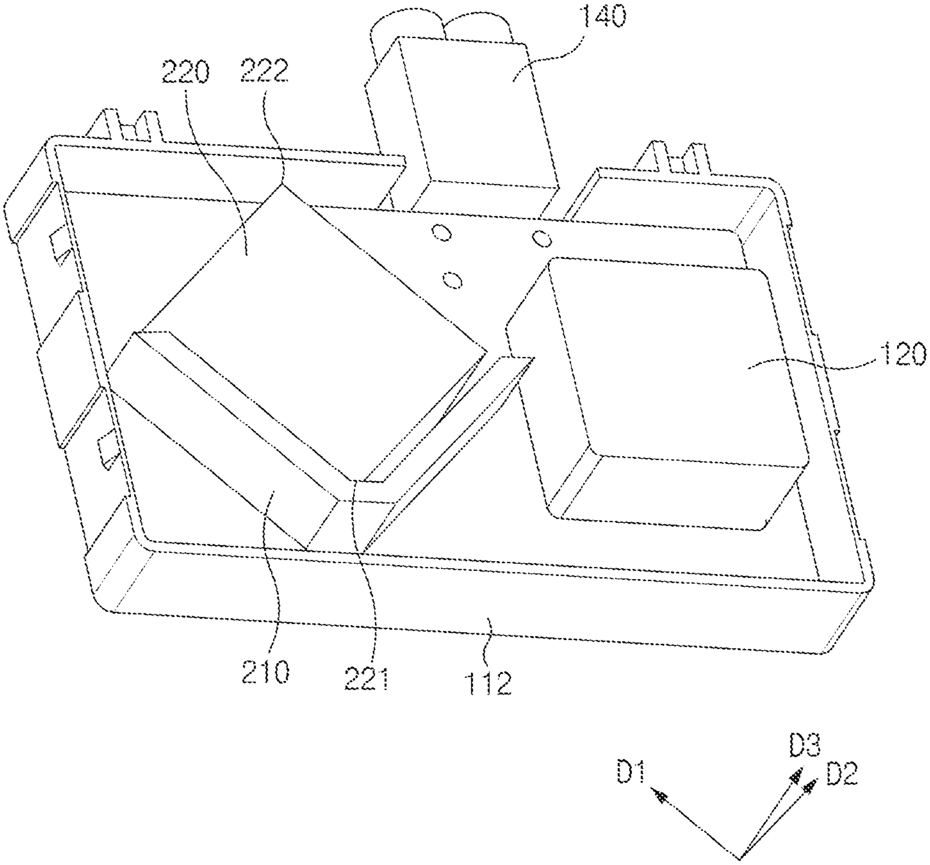
FIG. 2B is a view exemplarily illustrating the antenna device according to an exemplary embodiment of the present disclosure, from which a first cover is removed.
Figure 2C:
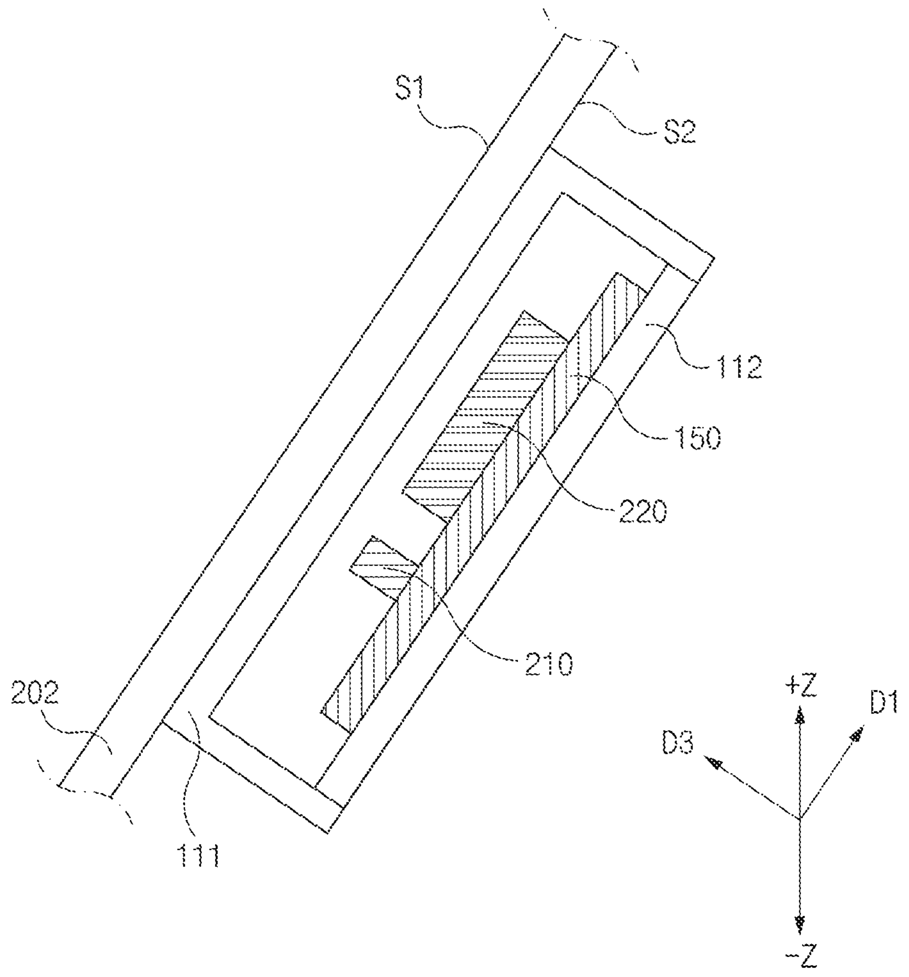
FIG. 2C is a cross-sectional view of the antenna device, taken along line A-A' in FIG. 2A.

FIG. 2A is a view exemplarily illustrating the antenna device according to an exemplary embodiment of the present disclosure, which is mounted on a vehicle, FIG. 2B is a view exemplarily illustrating the antenna device according to an exemplary embodiment of the present disclosure, from which a first cover is removed, and FIG. 2C is a cross-sectional view of the antenna device, taken along line A-A' in FIG. 2A.

Referring to FIG. 2A, FIG. 2B and FIG. 2C, the antenna device 101 according to various exemplary embodiments of the present disclosure may be formed on a transparent inclined surface which is disposed to be inclined with respect to a roof of the vehicle or a ground surface (or a road). For example, the antenna device 101 may be disposed on the transparent inclined surface which is at least one of a front glass 202, the side glass, or the rear glass of the vehicle. As an exemplary embodiment of the present disclosure, the antenna device 101 may be mounted on the roof of the vehicle or the front glass 202 disposed to be inclined with respect to the ground surface. The front glass 202 may include an external surface S1 that faces an outside of the vehicle, and an internal surface S2 which is opposite to the external surface S1 and faces the interior of the vehicle. The antenna device 101 may be mounted on the internal surface S2 of the front glass 202, which faces the interior of the vehicle. The first cover 111 of the antenna device 101 may be attached to the internal surface S2 of the front glass 202. The first cover 111 of the antenna device 101 may contact with the internal surface S2 of the front glass 202. The antenna device 101 may be disposed around an inside mirror 201.

The plurality of antennae 120 and 220 and the partition wall 210 included in the antenna device 101 may be disposed on the circuit board 150. The radiation patch of at least one of the plurality of antennae 120 and 220 may be formed to face a third direction D3 that faces an outside of the vehicle. The partition wall 210 may be formed to surround a portion of the first antenna 220. The partition wall 210 may be formed to surround, among side edge portions of the first antenna 220, a first edge portion 221 that faces a ground surface direction (e.g., the −Z axis direction) which is perpendicular to a ground surface, toward the ground surface, and may be formed not to surround a second edge portion 222 that faces an upward direction (e.g., the +Z axis direction) which is perpendicular to the ground surface, toward the upper side thereof.

Figure 3:
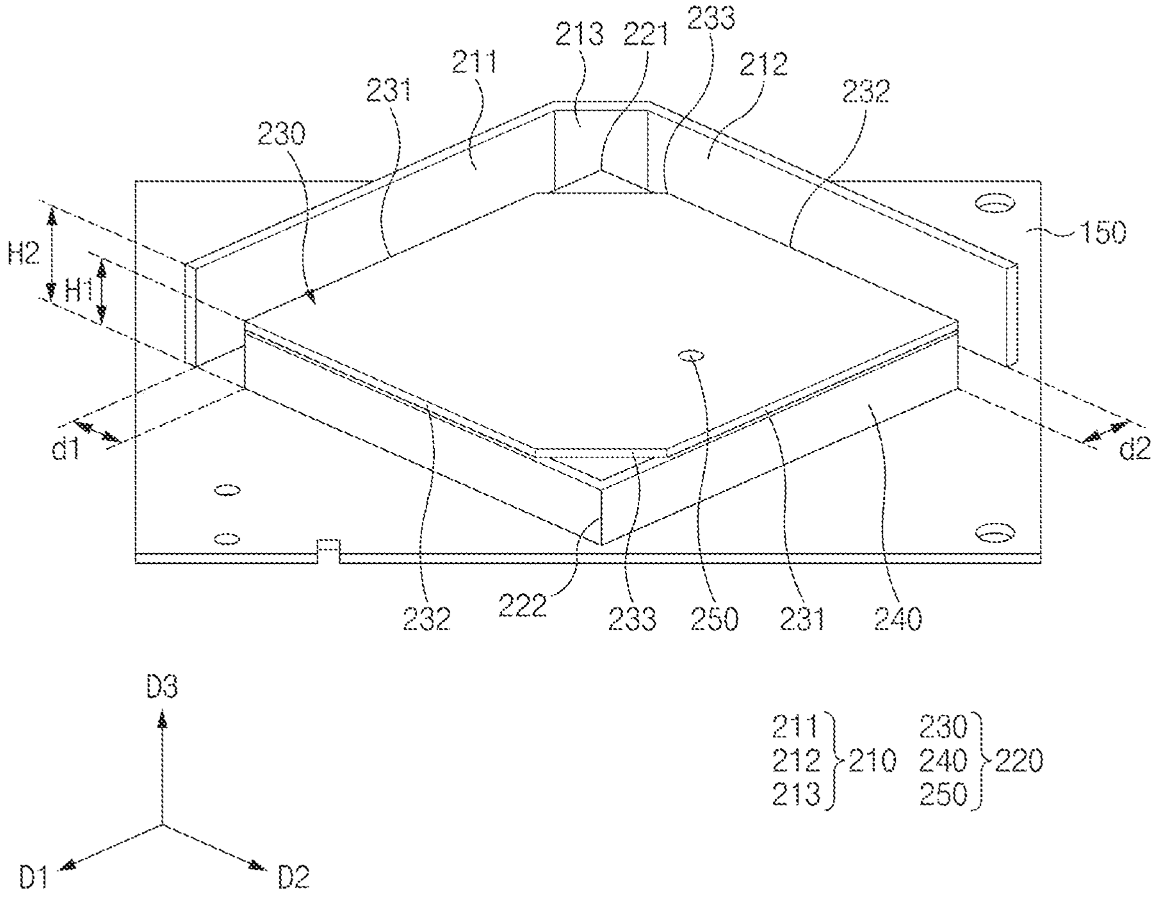
FIG. 3 is a perspective view exemplarily illustrating a first antenna and a partition wall included in an antenna device according to an exemplary embodiment of the present disclosure in detail.

FIG. 3 is a perspective view exemplarily illustrating the first antenna and the partition wall included in the antenna device according to an exemplary embodiment of the present disclosure in detail.

Referring to FIG. 3, the first antenna 220 may include a radiation patch 230, a base board 240, and a feeding pin 250.

The base board 240 may include a lower surface that faces the circuit board 150, an upper surface which is opposite to the lower surface, and at least one side surface which is disposed between the lower surface and the upper surface. The base board 240 may include a dielectric having a high permittivity.

The radiation patch 230 may be formed on an upper surface of the base board 240. The radiation patch 230 may include a thin plate of a conductive material of a high electrical conductivity, such as copper, aluminum, gold, or silver. The radiation patch 230 may have various shapes, such as a polygonal shape, a circular shape, or an elliptical shape, according to a shape of the base board 240. The radiation patch 230 may be changed to have various shapes through a process, such as frequency tuning. Accordingly, the radiation patch 230 is fed with electric power through the feeding pin 250 to be operated as an antenna that resonates in a satellite antenna frequency band.

According to an exemplary embodiment of the present disclosure, the radiation patch 230 may have various sizes and areas according to an operation frequency of the first antenna 220. An area of an upper surface of the radiation patch 230 may be formed to be smaller than an area of an upper surface of the base board 240. The upper surface of the radiation patch 230 may be formed to face the third direction D3 which is perpendicular to the front glass formed to be inclined with respect to the ground surface.

According to an exemplary embodiment of the present disclosure, the radiation patch 230 may include a plurality of side surfaces that are bent from the upper surface thereof. The plurality of side surfaces may extend in parallel to the third direction D3. The radiation patch 230 may include two first side surfaces 231, two second side surfaces 232, and at least one chamfer 233.

The first side surfaces 231 of the radiation patch 230 may be formed to be long along a first direction D1. The second side surfaces 232 of the radiation patch 230 may be formed to be long along a second direction D2, and may be formed to face the first side surfaces 231. The chamfers 233 of the radiation patch 230 may be formed between the first side surfaces 231 and the second side surfaces 232. A plurality of chamfers 233 may be formed in the radiation patch 230, and the plurality of chamfers 233 may be formed to be parallel to the facing chamfers 233.

The feeding pin 250 may pass through the base board 240 while being connected to the radiation patch 230. The feeding pin 250 may be disposed in parallel to a side surface of the base board 240. The feeding pin 250 may be mounted on the circuit board 150.

The partition wall 210 may be formed to surround at least a portion of the first antenna 220. For example, the partition wall 210 may be formed to include a "V" shape.

The partition wall 210 may be formed to be higher than the first antenna 220. As an exemplary embodiment of the present disclosure, on the circuit board 150, the first antenna 220 may be formed at a first height H1. Any one of a first partition wall area 211 or a second partition wall area 212 included in the partition wall 210 may be formed at a second height H2 which is greater than the first height H1.

According to an exemplary embodiment of the present disclosure, the partition 212. The first partition wall area 211 may face any one of the plurality of side surfaces of the first antenna 220. The second partition wall area 212 may face one of the plurality of side surfaces of the first antenna 220, which is different from the first partition wall area. The first partition wall area 211 and the second partition wall area 212 may be disposed to be perpendicular to the radiation patch of the first antenna 220.

According to an exemplary embodiment of the present disclosure, the partition wall 210 may include the first partition wall area 211, the second partition wall area 212, and a third partition wall area 213.

The first partition wall area 211 may include a length in the first direction D1, a width in the second direction D2, and a height in the third direction D3. The first partition wall area 211 may be disposed to face the first side surface 231 of the radiation patch 230 in the second direction D2. The first partition wall area 211 may be disposed to be perpendicular to the radiation patch 230 of the first antenna 220, which faces the third direction D3. The first partition wall area 211 may be spaced from the first antenna 220 by a first distance d1.

The second partition wall area 212 may include a length in the second direction D2, a width in the first direction D1, and a height in the third direction D3. The second partition wall area 212 may be disposed to face the second side surface 232 of the radiation patch 230 in the first direction D1. The second partition wall area 212 may be spaced from the first antenna 220 by a second distance d2. The second partition wall area 212 may be disposed to be perpendicular to the radiation patch 230 of the first antenna 220, which faces the third direction D3. The second distance d2 may be similar to or the same as the first distance d1.

The third partition wall area 213 may be disposed between the first partition wall area 211 and the second partition wall area 212. The third partition wall area 213 may be disposed in parallel to the chamfer 233 of the radiation patch 230. The third partition wall area 213 may be disposed to define an obtuse angle with at least one of the first partition wall area 211 and the second partition wall area 212. The third partition wall area 213 may correspond to, among the side edge portions of the first antenna 220, the first edge portion 221 that faces the ground surface (e.g., the −Z axis direction).

According to an exemplary embodiment of the present disclosure, the partition 212, without any third partition wall area 213. In the instant case, the first partition wall area 211 and the second partition wall area 212 may contact with each other. An edge portion between the first partition wall area 211 and the second partition wall area 212 may correspond to the first edge portion 221 of the first antenna 220.

According to an exemplary embodiment of the present disclosure, the partition wall 210 may be formed to surround at least a portion of the first antenna 220. The partition wall 210 may be formed to surround, among the side edge portions of the first antenna 220, the first edge portion 221 that faces the ground (e.g., the −Z axis direction). The partition wall 210 may be formed to face the first side surface 231 and the second side surface 232 that are located on opposite sides of the first edge portion 221. Circular polarization characteristics, by which the first antenna 220 is radiated, may be maintained more when two side surfaces are surrounded continuously than when the partition wall 210 is formed to surround one, three, or fourth side surfaces of the first antenna 220.

According to an exemplary embodiment of the present disclosure, the partition wall 210 may form a beam pattern which is radiated from the radiation patch 230 of the first antenna 220. The partition wall 210 may control a beam pattern which is radiated from the radiation patch of the first antenna 220 when a satellite signal is received through the first antenna 220. The partition wall 210 may guide a beam radiated form the radiation patch 230 of the first antenna 220 in a direction which is perpendicular to the front glass during an operation of the first antenna 220 so that the beam is inclined in a direction (or an upward direction) (or a roof (e.g., a direction which a roof 21 of FIG. 1 faces)) (+Z axis) which is perpendicular to the ground surface, toward an opposite direction to the ground surface (or a road). Accordingly, the first antenna 220 may increase a signal reception sensitivity of a satellite signal as a radiation pattern which is suitable for the upward direction (+Z axis) through beam tilting through the partition wall 210 while circular polarization characteristics are maintained.

Figure 4A:
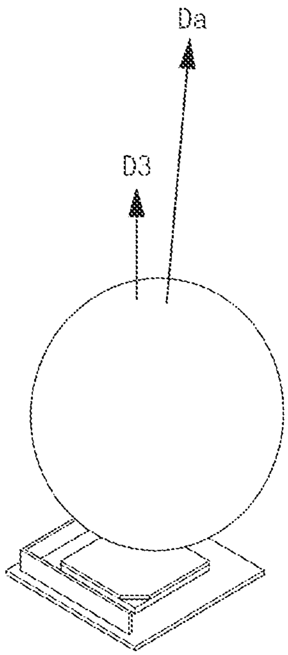
FIG. 4A and FIG. 4B are views exemplarily illustrating radiation patterns of an antenna device according to an exemplary embodiment of the present disclosure.
Figure 4B:
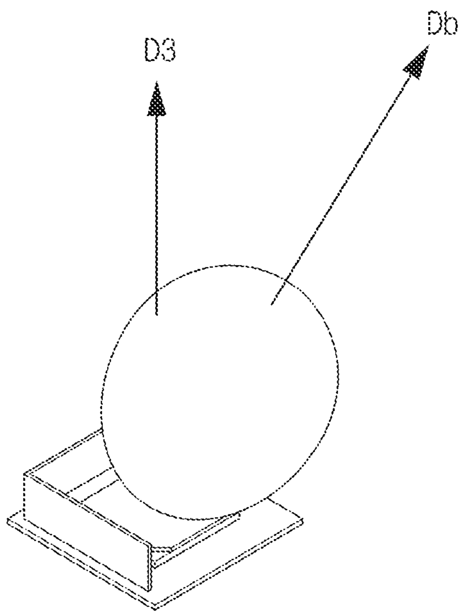

FIG. 4A and FIG. 4B are views exemplarily illustrating the radiation patterns of the antenna device according to an exemplary embodiment of the present disclosure. For example, FIG. 4A is a view exemplarily illustrating a radiation pattern when a height of the partition wall 210 is 10 mm, and FIG. 4B is a view exemplarily illustrating a radiation pattern when the height of the partition wall 210 is 15 mm.

Referring to FIG. 4A and FIG. 4B, the beam radiated in the third direction D3 (or the first radiation direction) which is perpendicular to the front glass of the vehicle or the radiation patch 230 of the first antenna 220 through the first antenna 220 may be inclined toward the upward direction (+Z) (or the second radiation direction) by the partition wall 210. Accordingly, the beam that passes via the partition wall 210 from the first antenna 220 may be radiated in one direction Da and Db which is inclined toward the upward direction (+Z) from the third direction D3. Accordingly, the beam radiated from the first antenna 220 may be inclined more toward the upward direction (+Z) as the height of the partition wall 210 becomes larger. As an exemplary embodiment of the present disclosure, the beam radiated from the first antenna 220 may be inclined more toward the upward direction (+Z) when the height of the partition wall 210 is 15 mm than when it is 10 mm. Accordingly, a signal reception sensitivity of a satellite signal may be increased through the antenna device including the first antenna 220 and the partition wall 210.

Figure 5:
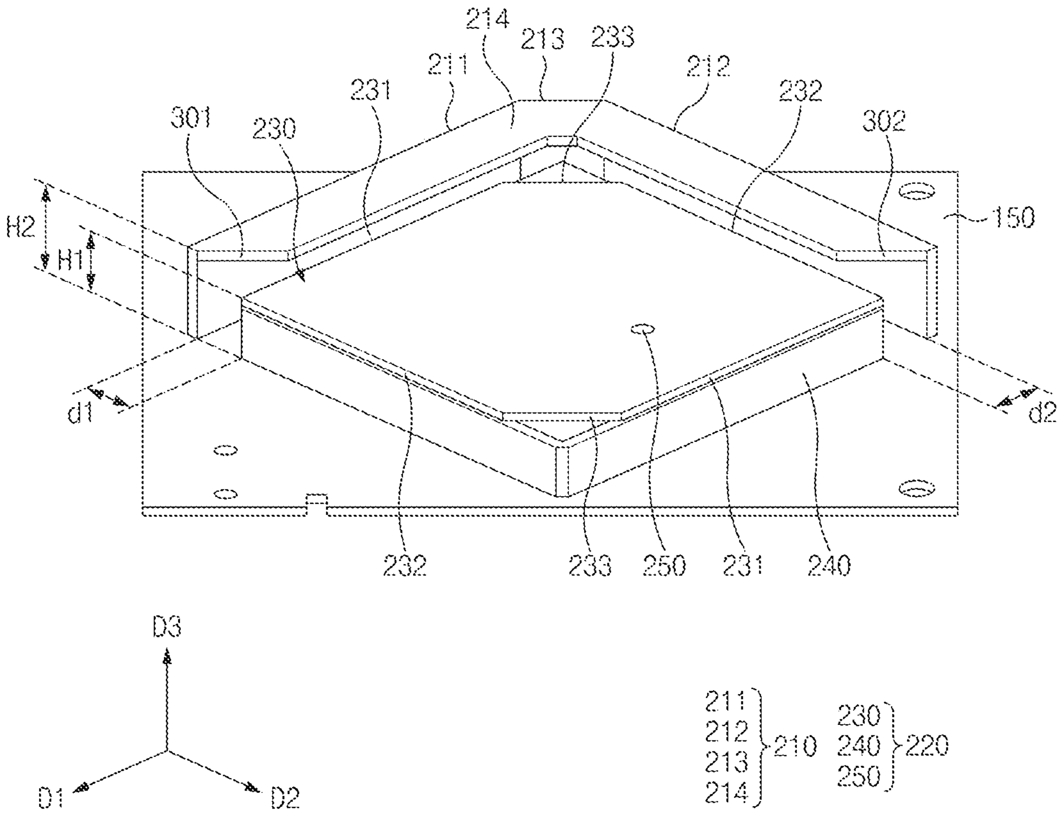
FIG. 5 is a perspective view exemplarily illustrating an antenna device according to an exemplary embodiment of the present disclosure.

FIG. 5 is a perspective view exemplarily illustrating the antenna device according to an exemplary embodiment of the present disclosure.

Referring to FIG. 5, the antenna device according to an exemplary embodiment of the present disclosure may include the same components as those of the antenna devices illustrated in FIG. 1, FIG. 2, and FIG. 3, except that it further includes a protruding area 214. Accordingly, the same component will be denoted by the same reference numerals, and a detailed description of the same components will be omitted.

The partition wall 210 may include the first partition wall area 211, the second partition wall area 212, the third partition wall area 213, and the protruding area 214. The protruding area 214 may be disposed to be parallel to the radiation patch 230 of the first antenna 220, which faces the third direction D3. The protruding area 214 may be bent from at least one of the first partition wall area 211, the second partition wall area 212, or the third partition wall area 213 to extend toward the first antenna 220.

As an exemplary embodiment of the present disclosure, the protruding area 214 may overlap at least one of the first partition wall area 211, the second partition wall area 212, or the third partition wall area 213, and at least a portion of the circuit board 150, which is exposed through the first antenna 220.

As an exemplary embodiment of the present disclosure, the protruding area 214 may extend from at least one of the first partition wall area 211, the second partition wall area 212, or the third partition wall area 213 to an upper side of a partial area of the first antenna 220. The protruding area 214 may overlap at least one of the first partition wall area 211, the second partition wall area 212, or the third partition wall area 213, and at least a portion of the circuit board 150, which is exposed through the first antenna 220. Furthermore, the protruding area 214 may overlap a portion of the radiation patch 230 of the first antenna 220 while being spaced from the radiation patch 230 of the first antenna 220.

According to an exemplary embodiment of the present disclosure, the partition wall 210 may form a beam pattern radiated from the radiation patch 230 of the first antenna 220. The partition wall 210 may control a beam pattern radiated from the radiation patch of the first antenna 220 when receiving a satellite signal through the first antenna 220. The partition wall 210 may guide a beam radiated form the radiation patch 230 of the first antenna 220 in a direction which is perpendicular to the front glass during an operation of the first antenna 220 so that the beam is inclined in a direction (or an upward direction) (or a roof (e.g., a direction which the roof 21 of FIG. 1 faces)) (+Z axis) which is perpendicular to the ground surface, toward an opposite direction to the ground surface (or a road). Accordingly, the first antenna 220 may increase a signal reception sensitivity of a satellite signal as a radiation pattern which is suitable for the upward direction through beam tilting through the partition wall 210 while circular polarization characteristics are maintained is formed.

According to an exemplary embodiment of the present disclosure, as a width of the protruding area 214 becomes larger while a height of the partition wall 210 is constant, a tilting angle of the beam of the first antenna 220 through the partition wall 210 may become larger. The beam of the first antenna 220 may be inclined while the circular polarization characteristics are maintained even though the height of the partition wall 210 is not increased. Accordingly, the thickness of the antenna due to the partition wall 210 may be prevented from being increased and thus the antenna device may be small-sized.

Figure 6A:
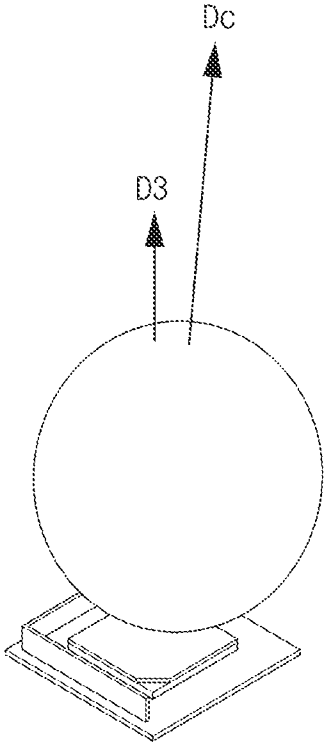
FIG. 6A and FIG. 6B are views exemplarily illustrating radiation patterns of an antenna device according to an exemplary embodiment of the present disclosure.
Figure 6B:
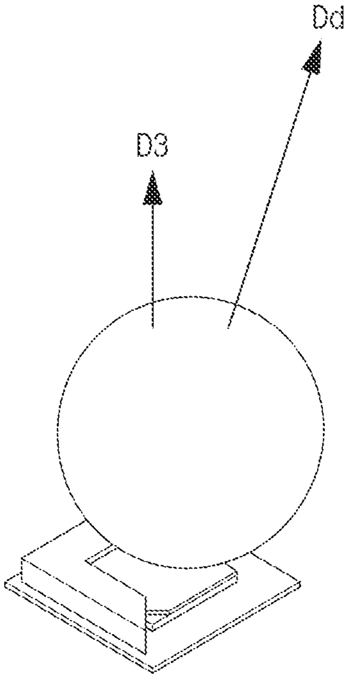

FIG. 6A and FIG. 6B are views exemplarily illustrating the radiation patterns of the antenna device according to an exemplary embodiment of the present disclosure. For example, FIG. 6A is a view exemplarily illustrating a radiation pattern when the height of the partition wall 210 is 10 mm and the width of the protruding area 214 is 5 mm, and FIG. 6B is a view exemplarily illustrating a radiation pattern when the height of the partition wall 210 is 10 mm and the width of the protruding area 214 is 15 mm.

Referring to FIG. 6A and FIG. 6B, the beam radiated in the third direction D3 (or the first radiation direction) which is perpendicular to the front glass of the vehicle or the radiation patch 230 of the first antenna 220 through the first antenna 220 may be inclined toward the upward direction (+Z) (or the second radiation direction) by the partition wall 210. Accordingly, the beam that passes via the partition wall 210 from the first antenna 220 may be radiated in one direction Dc and Dd that are inclined toward the upward direction (+Z) from the third direction D3. Accordingly, the beam radiated from the first antenna 220 may be inclined more toward the upward direction (+Z) as the width of the protruding area 214 becomes larger while the height of the partition wall 210 is constant. As an exemplary embodiment of the present disclosure, the beam radiated from the first antenna 220 may be inclined more toward the upward direction (+Z) when the width of the protruding area is 15 mm than when it is 5 mm while the height of the partition wall 210 is a constant value of 10 mm. Accordingly, a signal reception sensitivity of a satellite signal may be increased through the antenna device including the first antenna 220 and the partition wall 210.

Figure 7:
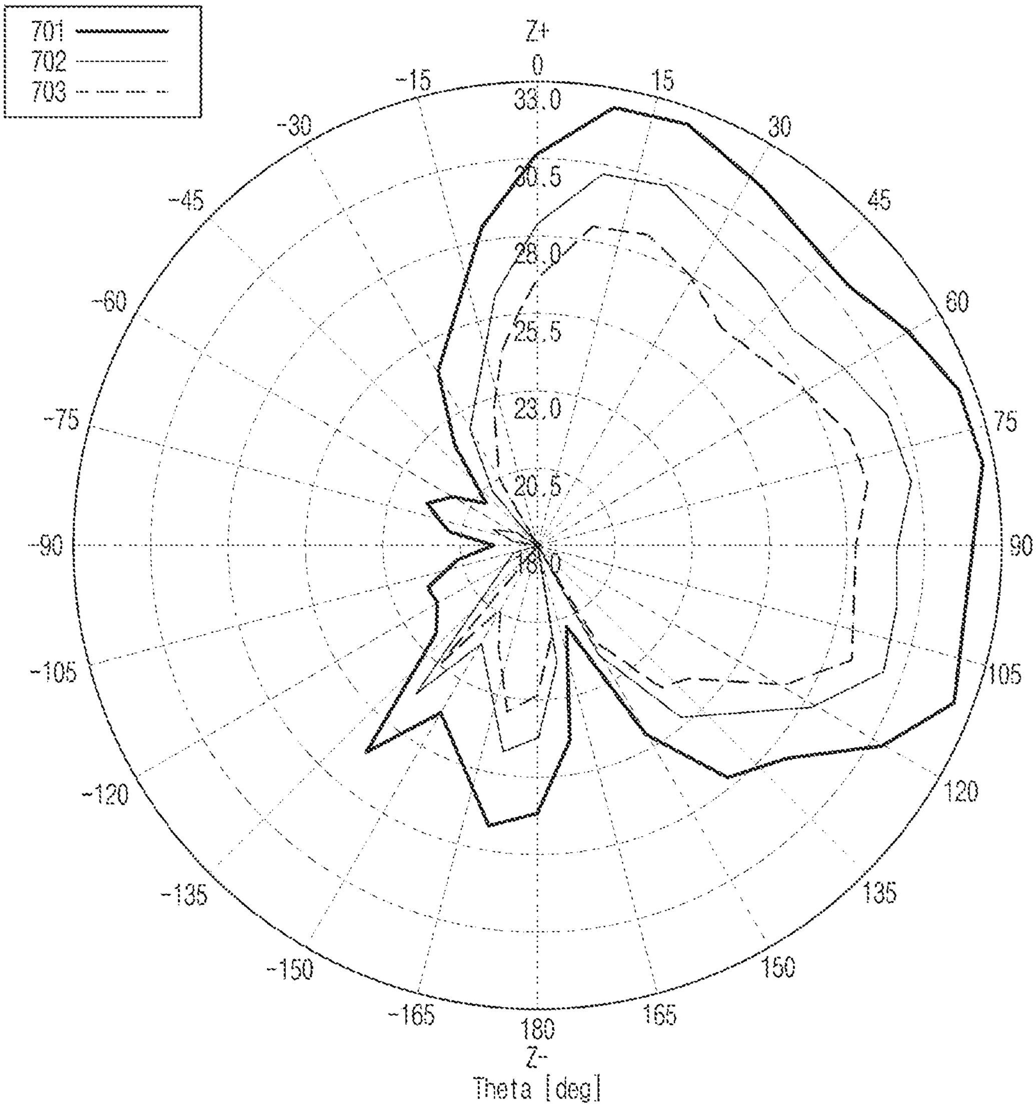
FIG. 7 is a view exemplarily illustrating radiation patterns for frequency bands of an antenna device according to an exemplary embodiment of the present disclosure.

FIG. 7 is a view exemplarily illustrating radiation patterns for frequency bands of the antenna device according to an exemplary embodiment of the present disclosure.

Referring to FIG. 7, an antenna device which is operated at a first frequency (e.g., 2332 MHz) band 701, a second frequency (e.g., 2345 MHz) band 702, and a third frequency (e.g., 2320 MHz) band 703 may receive a satellite signal including a circular polarization at an angle of 0 degrees to 60 degrees. It may be seen that the antenna device including the first antenna 220 and the partition wall 210 has excellent radiation characteristics of a satellite signal which is received at an angle of 0 degree to 60 degrees. Accordingly, it may be seen that the antenna device according to an exemplary embodiment of the present disclosure has antenna characteristics of stably receiving a satellite signal at a satellite frequency band.

The present technology may tilt a beam radiated in a direction which is perpendicular to a transparent inclined surface of an interior of a vehicle, in a direction which is perpendicular to a ground surface, through a partition wall, and may maintain a circular polarization of the beam at the same time. Accordingly, the present technology may enhance an antenna performance, for example, may increase a signal reception sensitivity of a satellite signal.

The present technology may include the partition wall including the protruding area to prevent a thickness of the antenna device from being increased whereby the antenna device may be small-sized.

The present technology may maintain an excellent external appearance in design as the antenna device is provided inside the vehicle.

Furthermore, various effects directly or indirectly recognized through the present disclosure may be provided.

The above description is a simple exemplification of the technical spirits of the present disclosure, and the present disclosure may be variously corrected and modified by those skilled in the art to which the present disclosure pertains without departing from the essential features of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An antenna apparatus comprising:

at least one antenna disposed on a transparent inclined surface in an interior of a vehicle, and including a radiation patch facing a first radiation direction being perpendicular to the inclined surface; and a partition wall surrounding at a portion of the at least one antenna, wherein the partition wall is configured so that a beam radiated from the radiation patch in the first radiation direction is inclined from the first radiation direction toward a second radiation direction, wherein the partition wall includes at least two first partition wall areas with a predetermined angle therebetween, wherein the at least two first partition wall areas of the partition wall includes:

a first partition wall area facing one side surface of side surfaces of the at least one antenna; and a second partition wall area facing, among the side surfaces, a side surface being different from the one side surface which the first partition wall faces, wherein the partition wall further includes a third partition wall area connecting the first partition wall area and the second partition wall area, and wherein the partition wall further includes a protruding area bent from at least one of the first partition wall area, the second partition wall area and the third partition wall area and protruding toward the at least one antenna.

2. The antenna apparatus of claim 1, wherein the partition wall is formed to surround at least a portion of two side surfaces defining any one of side edge portions of the at least one antenna.

3. The antenna apparatus of claim 2, wherein the partition wall is formed to surround at least a portion of the two side surfaces defining the side edge portion facing an opposite direction to the second radiation direction.

4. The antenna apparatus of claim 1, wherein the partition wall is formed to be higher than a height of the at least one antenna.

5. The antenna apparatus of claim 1, wherein the first partition wall area, the second partition wall area and the third partition wall area are spaced from the at least one antenna with a predetermined distance.

6. The antenna apparatus of claim 1, wherein the partition wall is disposed so that the first partition wall area and the second partition wall area are perpendicular to the radiation patch.

7. The antenna apparatus of claim 5, wherein a height of at least one of the first partition wall area or the second partition wall area is greater than a height of the at least one antenna.

8. The antenna apparatus of claim 1, wherein the protruding area is disposed to be parallel to the radiation patch.

9. The antenna apparatus of claim 1, further including:

a circuit board, in which the at least one antenna and the partition wall are disposed, wherein the protruding area is exposed between the at least one antenna and the partition wall.

10. The antenna apparatus of claim 1, wherein the protruding area overlaps a portion of the radiation patch while being spaced from the radiation patch.

11. The antenna apparatus of claim 1, wherein the partition wall is formed to face a chamfer formed in the radiation patch.

12. The antenna apparatus of claim 1, wherein the at least one antenna receives a signal of a satellite frequency band.

13. The antenna apparatus of claim 1, further including:

a case defining an accommodation space, in which the at least one antenna and the partition wall are accommodated, wherein the case includes:

a first cover; and a second cover facing the first cover, and on which a circuit board, on which the at least one antenna and the partition wall are disposed, is accommodated.

14. The antenna apparatus of claim 13, wherein the first cover is attached to the transparent inclined surface of the vehicle.

15. The vehicle that communicates with an external device, the vehicle including:

the antenna apparatus of claim 1.

16. The vehicle of claim 15, wherein the transparent inclined surface is a front glass of the vehicle, and wherein the partition wall tilts a beam radiated from the at least one antenna in the first radiation direction being perpendicular to the front glass, in a direction being perpendicular to a ground surface and facing an opposite direction to the ground surface.

* * * * *